United States Patent
de Ruijter et al.

(10) Patent No.: US 9,720,875 B2
(45) Date of Patent: Aug. 1, 2017

(54) RECEIVER WITH SIGNAL ARRIVAL DETECTION CAPABILITY

(71) Applicant: Silicon Laboratories Inc., Austin, TX (US)

(72) Inventors: Hendricus de Ruijter, Sunnyvale, CA (US); Wentao Li, Mountain House, CA (US)

(*) Notice: Subject to any disclaimer, the term of this patent is extended or adjusted under 35 U.S.C. 154(b) by 0 days.

(21) Appl. No.: 13/949,837

(22) Filed: Jul. 24, 2013

(65) Prior Publication Data

US 2015/0030061 A1    Jan. 29, 2015

(51) Int. Cl.
| | | |
|---|---|---|
| *H04L 27/06* | (2006.01) | |
| *G06F 13/42* | (2006.01) | |
| *H04L 27/22* | (2006.01) | |
| *H04W 56/00* | (2009.01) | |
| *H04J 3/16* | (2006.01) | |

(52) U.S. Cl.
CPC .......... *G06F 13/4295* (2013.01); *H04L 27/22* (2013.01); *H04W 56/00* (2013.01); *H04J 3/1605* (2013.01)

(58) Field of Classification Search
None
See application file for complete search history.

(56) References Cited

U.S. PATENT DOCUMENTS

| | | | | |
|---|---|---|---|---|
| 5,504,454 A | * | 4/1996 | Daggett | H02J 13/0027 329/304 |
| 6,137,846 A | | 10/2000 | Kawai | |
| 7,003,063 B2 | | 2/2006 | Mill | |
| 2002/0154620 A1 | * | 10/2002 | Azenkot | H04L 5/026 370/347 |
| 2003/0043947 A1 | * | 3/2003 | Zehavi | H04L 27/22 375/365 |
| 2004/0001532 A1 | * | 1/2004 | Mason, Jr. | H04B 1/7156 375/136 |
| 2007/0274416 A1 | * | 11/2007 | Ishii | 375/321 |
| 2013/0083648 A1 | | 4/2013 | de Ruijter | |

OTHER PUBLICATIONS

G. D. Arndt and F. J. Loch, "A Study of FM Threshold Extension Techniques," National Aeronautics and Space Administration, Apr. 1972, 57 Pages, Technical Report, Report No. NASA TR R-384.
Silicon Laboratories Inc., "High-Performance, Low-Current Transceiver," Data Sheet, Si4464/63/61/60, Rev. 1.2, 56 Pages, Dec. 2012.

* cited by examiner

*Primary Examiner* — Wednel Cadeau
(74) *Attorney, Agent, or Firm* — Polansky & Associates, P.L.L.C.; Paul J. Polansky (57) ABSTRACT

A receiver includes a phase click detector, a controller, and a comparator. The phase click detector detects phase clicks in an input signal, where a phase click corresponds to a change in phase of at least a first threshold. The controller is coupled to the phase click detector for calculating a number of phase clicks within one or more time periods. The comparator compares the number of phase clicks within the one or more time periods, and provides an arrival signal if the number of phase clicks is less than a second threshold.

19 Claims, 7 Drawing Sheets

RECEIVER WITH SIGNAL ARRIVAL DETECTION CAPABILITY

CROSS REFERENCE TO RELATED, COPENDING APPLICATION

Related subject matter is contained in copending application Ser. No. 14/080,405, filed Nov. 14, 2013, entitled "Receiver with Signal Arrival Detection Capability," invented by Hendricus de Ruijter and Wentao Li and assigned to the assignee hereof.

FIELD OF THE DISCLOSURE

The present disclosure relates generally to receivers and, more particularly to a receiver for wireless communication signals such as radio frequency (RF) signals having a short preamble.

BACKGROUND

Wireless RF receivers are used in a wide variety of applications such as smart metering, remote control, home security and alarm, telemetry, garage and gate openers, remote keyless entry, and the like. As used herein, a "radio frequency" signal means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. One common type of RF receiver is a frequency-shift keying (FSK) receiver that is compatible with the industrial, scientific and medical (ISM) radio bands in the 119 to 1050 megahertz (MHz) range. ISM radio bands are portions of the radio spectrum reserved internationally for the use of RF energy for industrial, scientific and medical purposes other than communication.

Certain wireless communication standards define a preamble for a wireless packet which is basically a leading packet a receiver detects, and uses to settle its control loops. These control loops include the Automatic Gain Control (AGC), Automatic Frequency Compensation (AFC), and Bit Clock Recovery (BCR). After the receiver detects the end of the preamble, the receiver is prepared to receive a full packet of payload data. While many standards define a relatively long preamble pattern length (about 32 preamble bits in an alternating . . . 1010 . . . pattern) to provide enough time for these loops to settle, the N-mode of the wireless version of the Meter-Bus (M-Bus) standard, no. EN 13757-4, defines a relatively short preamble (about 16 bits in an alternating . . . 1010 . . . pattern). Although the shorter preamble provides an opportunity for the receiver to work faster and to take advantage of corresponding power savings, the shorter preamble also increases the burden on the receiver to reliably detect the signal arrival of the preamble, and to settle its control loops in time.

In general, known receivers need to settle the AFC before they can reliably detect the preamble. If the AFC tracks noise that is included in the RF signal, and wanders in response to the noise, the receiver could struggle to detect the preamble signal, and could miss the preamble and a subsequent data packet.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
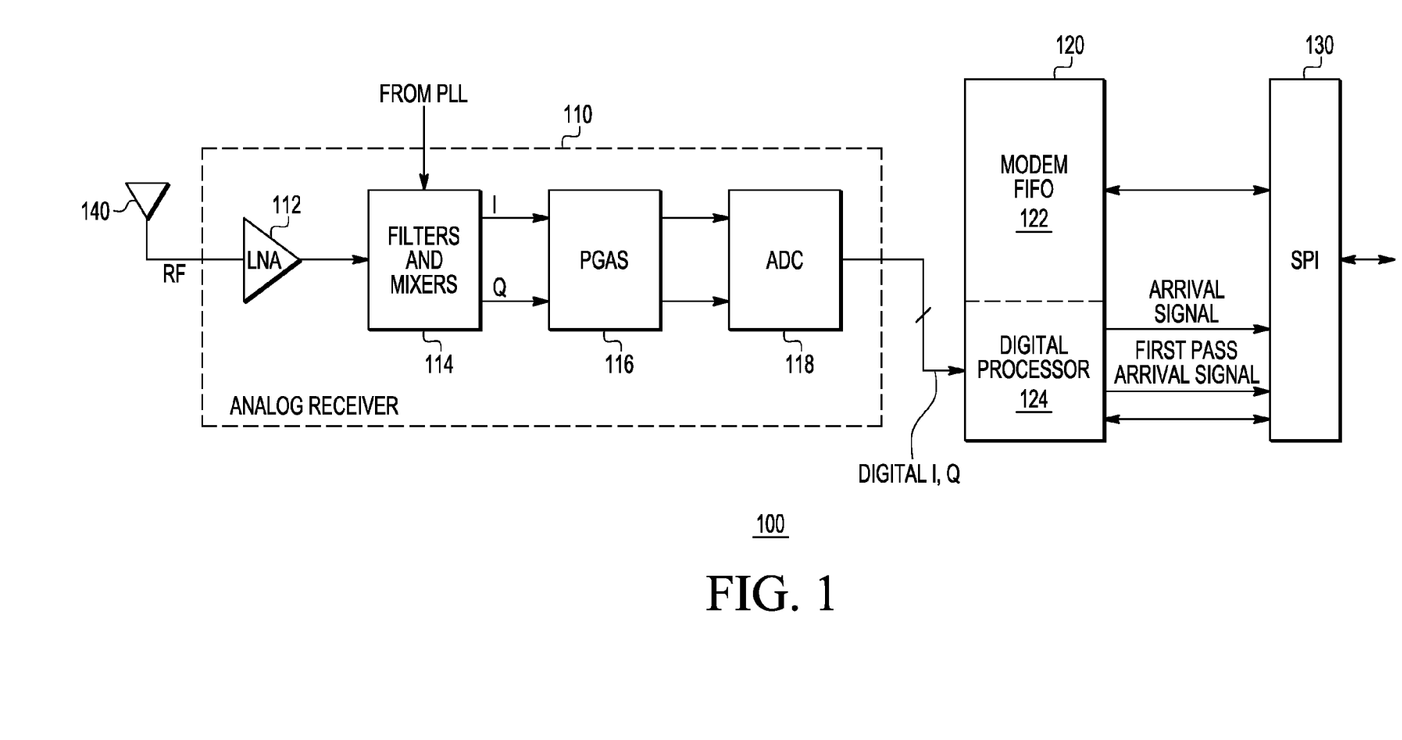
FIG. 1 illustrates in partial block diagram and partial schematic form a receiver according to one embodiment.

FIG. 1 illustrates in partial block diagram and partial schematic form a receiver 100 according to one embodiment. For the example shown in FIG. 1, receiver 100 generally includes an analog receiver 110, a digital channel circuit 120, a serial peripheral interface (SPI) controller 130 labeled "SPI", and an antenna 140.

Analog receiver 110 includes a low noise amplifier 112 labeled "LNA", a multiple number of filters and mixers 114, a multiple number of programmable gain amplifiers 116 labeled "PGAs", and an analog-to-digital converter 118 labeled "ADC". LNA 112 has an input for receiving a radio frequency broadcast signal labeled "RF" and an output. Multiple filters and mixers 114 has a first input connected to the output of LNA 112, a second input connected to an output of a phase locked loop (not shown) for receiving a local oscillator signal, and a first output for providing an in-phase intermediate frequency (IF) output labeled "I", and a second output for proving a quadrature IF output labeled "Q". Each of PGAs 116 has a first input connected to the first output of multiple filters and mixers 114 for receiving the I signal, and a second input connected to the second output of multiple filters and mixers 114 for receiving the Q signal, a first output, and a second output. ADC 118 has a first input connected to the first output of multiple PGAs 116, a second input connected to the second output of multiple PGAs 116, and an output for providing a set of signals labeled "DIGITAL I, Q".

Digital channel circuit 120 includes a modulator-demodulator first-in, first-out buffer 122 labeled "MODEM FIFO", and a digital processor 124. MODEM FIFO 122 is connected to SPI 130. Digital processor 124 has an input connected to the output of ADC 118 for receiving the DIGITAL I, Q signals, a first output for providing a signal labeled "ARRIVAL SIGNAL", and a second output for providing a signal labeled "FIRST PASS ARRIVAL SIGNAL".

SPI 130 is connected to MODEM FIFO 122, has a first input connected to the output of digital processor 124 for receiving the ARRIVAL SIGNAL, a second input connected to the output of digital processor 124 for receiving the FIRST PASS ARRIVAL SIGNAL, is connected to digital processor 124, and is adapted to connect to a set of SPI peripherals (not shown).

Antenna 140 delivers the RF signal to the input of LNA 112.

Some known receivers detect the arrival of a signal by comparing the demodulated data stream with an expected bit sequence. The receiver uses this technique to detect a preamble pattern. However, by relying on the demodulated data, the receiver may be susceptible to missing the preamble and a following data packet. This problem increases in difficulty when the receiver attempts to detect a shorter preamble. Also, some known receivers may use pattern recognition techniques to detect preambles. Although pattern recognition techniques may provide a more reliable way to detect the preamble, pattern recognition circuits generally consume precious circuit area and power of the receiver.

A receiver, as described herein, achieves fast frequency convergence and conserves power, while reliably detecting short preambles in a relatively short time period. The receiver includes a signal arrival detector that reacts well to frequency offset, thus AFC can be postponed until after the signal arrival detector detects the preamble signal.

In operation, LNA 112 receives the RF signal from antenna 140 and provides an amplified internal signal to filters and mixers 114. In one embodiment, the RF signal supports an M-Bus compatible short preamble. A PLL (not shown) within receiver 100 provides a local oscillator signal to filters and mixers 114. Receiver 100 uses the local oscillator signal to support configurable data rates, for example, from 100 bits per second (bps) to 1 million bps. Filters and mixers 114 convert the amplified internal signal into in-phase (I) and quadrature (Q) components at a low IF and then filter the I and Q signals in corresponding low pass filters that reject frequencies above the selected IF. The signal levels are adjusted in PGAs 116, using well-known AGC techniques. ADC 118 converts the outputs of PGAs 116 to the DIGITAL I, Q signals. MODEM FIFO 122 exchanges data through SPI 130 with, for example, a microcontroller unit (MCU), not shown, and collects receive data from the FIFO buffer, applies transmit data to the FIFO buffer, and configures the radio. MODEM FIFO 122 is a 128 kilobyte (kB) FIFO that supports different configurations. In one configuration, MODEM FIFO 122 operates as a 64 kB transmit FIFO and a 64 kB receive FIFO. In another configuration, MODEM FIFO 122 operates as a 128 kB receive FIFO. In yet another configuration, MODEM FIFO 122 includes a 128 kB transmit FIFO. Digital processor 124 processes the DIGITAL I, Q signals in the digital domain to form the ARRIVAL SIGNAL, after detecting a desired signal, for example, a short preamble. In one embodiment, receiver 100 is a FSK compatible receiver.

Figure 2:
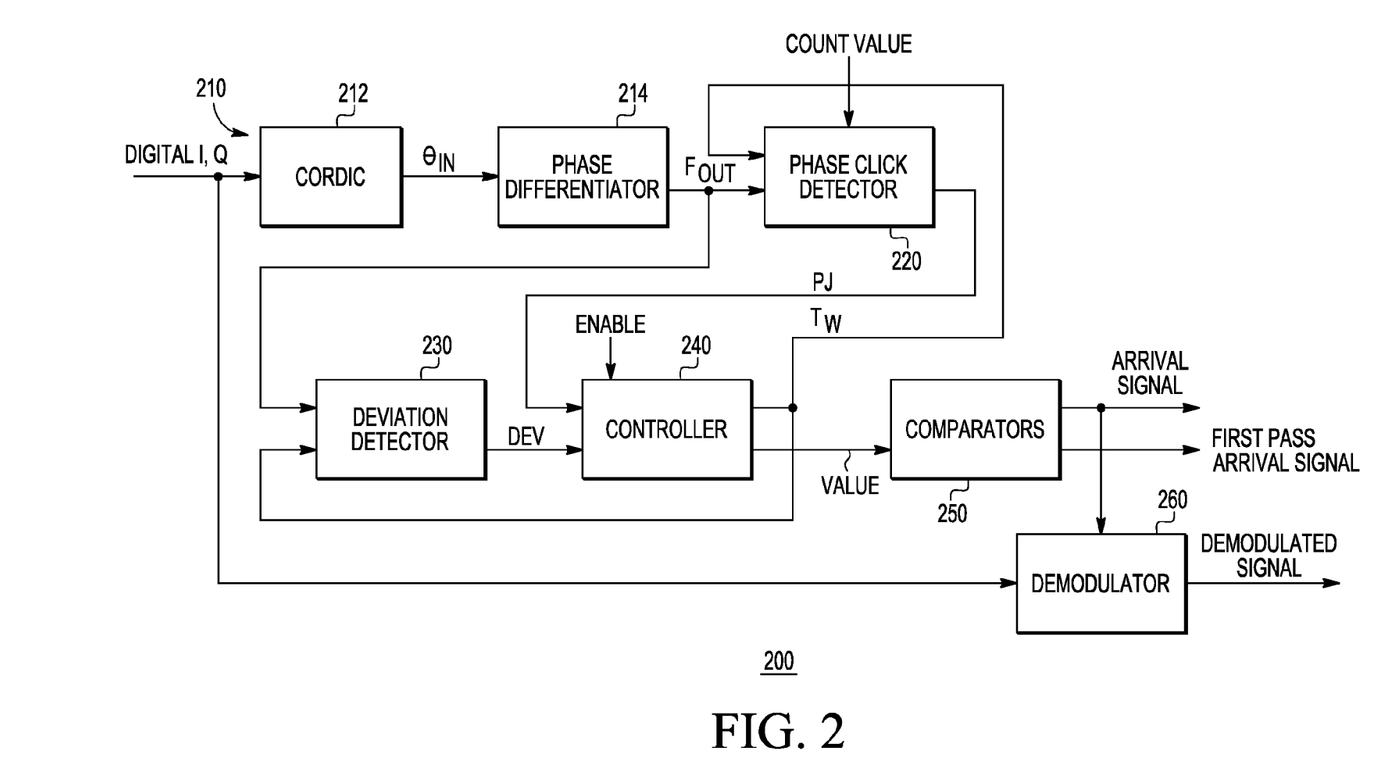
FIG. 2 illustrates in block diagram form a signal arrival detector that may be used in the digital processor of FIG. 1.

FIG. 2 illustrates in block diagram form a signal arrival detector 200 that may be used in digital processor 124 of FIG. 1. For the example shown in FIG. 2, signal arrival detector 200 generally includes a phase logic unit 210, a phase click detector 220, a deviation detector 230, a controller 240, a set of comparators 250, and a demodulator 260. Phase logic unit 210 includes a COordinate Rotation DIgital Computer 212 labeled "CORDIC", and a phase differentiator 214. For the implementation in FIG. 2, phase logic unit 210 and demodulator 260 are shown as separate functions. In other embodiments, demodulator 260 could include selected functions of signal arrival detector 200, for example, phase logic unit 210.

CORDIC 212 has an input for receiving the DIGITAL I, Q signals and output for providing a signal labeled "$\Theta_{IN}$". Phase differentiator 214 has an input connected to the output of CORDIC 212 for receiving the $\Theta_{IN}$ signal and an output for providing a signal labeled "$F_{OUT}$".

Phase click detector 220 has a first input for receiving a signal labeled "$T_W$", a second input connected to the output of Phase differentiator 214 for receiving the $F_{OUT}$ signal, a third input for receiving a signal labeled "COUNT VALUE", and an output for providing a "phase click" (sometimes called a "phase jump") signal labeled "PJ". Deviation detector 230 has a first input connected to the output of phase differentiator 214 for receiving the $F_{OUT}$ signal, a second input for receiving the $T_W$ signal, and an output for providing a deviation signal labeled "DEV". Controller 240 has a first input connected to the output of phase click detector 220 for receiving the PJ signal, a second input connected to the output of deviation detector 230 for receiving the DEV signal, a third input for receiving an increment signal labeled "ENABLE", a first output connected to the first input of phase click detector 220 and the second input of deviation detector 230 for providing the $T_W$ signal, and a second output for providing a signal labeled "VALUE". The set of comparators 250 has an input connected to the second output of controller 240 for receiving the VALUE signal, a first output for providing the ARRIVAL SIGNAL, and a second output for providing the FIRST PASS ARRIVAL SIGNAL. Demodulator 260 has a first input for receiving the DIGITAL I, Q signals, a second input connected to the first output of the set of comparators 250 for receiving the ARRIVAL SIGNAL, and an output for providing the DEMODULATED SIGNAL.

In operation, ADC 118 provides the DIGITAL I, Q signals to CORDIC 212. CORDIC 212 calculates a relative phase of the DIGITAL I, Q signals and provides $\Theta_{IN}$ to phase differentiator 214. The DIGITAL I, Q signals include additive white Gaussian noise (AWGN) that is represented by the Fourier transform equation:

$$-AWGN(t) = A_n(t) \times (e^{-iwt+\Theta n(t)}); \quad [1]$$

Where "$A_n$" is the amplitude of the AWGN (t) signal, "$\Theta_{IN}$" is the phase of the AWGN (t) signal, "w" is a real frequency variable, and, "i" is a complex number used by Fourier transforms.

Phase differentiator 214 provides the $F_{OUT}$ signal to phase click detector 220. The $F_{OUT}$ signal has time varying amplitude, phase, and frequency components. In the frequency domain, phase differentiator 214 provides the $F_{OUT}$ signal with phase shift information of the $\Theta_{IN}$ signal. Phase click detector 220 uses the information included in the phase component of the $F_{OUT}$ signal that is mathematically represented as the first derivative of $\Theta_{IN}$:

$$V(t) = \frac{d\Theta IN(t)}{dt}; \quad [2]$$

Phase click detector 220 counts a number of phase clicks corresponding to certain phase changes of the $F_{OUT}$ signal during a timing window defined by the $T_W$ signal that is a programmable $T_W$ period. Phase click detector 220 asserts the PJ signal (PJ=1) when the number of detected phase clicks during the Tw period is smaller than the threshold determined by the "COUNT VALUE" signal. Phase click detector 220 deasserts the PJ signal (PJ=0) when the number of detected phase clicks during the Tw period is greater than, or equal to the threshold determined by the "COUNT VALUE" signal. The COUNT VALUE signal defines an appropriate number of phase clicks for phase click detector 220 to indicate whether the RF signal is dominated by noise, or if the RF signal could be a valid signal. For example, when the RF signal has a low signal to noise ratio, phase click detector 220 detects a relatively high number of phase clicks (for example, four phase clicks during a Tw period that represents 2 bit periods), where a Tw period is an amount of time it takes for a transmitter to send a data bit. The higher number of phase clicks indicates the RF signal is dominated by noise. As the signal level of the RF signal increases in strength, phase click detector 220 detects a lower number of phase clicks (for example, zero to one phase clicks during a Tw period). As a point of reference, the difference between zero or one phase click and four phase clicks is about 1 to 2 dB in the signal strength of the RF signal.

Phase click detector 220 and deviation detector 230 provide the PJ signal and the DEV signals, respectively, to controller 240. Controller 240 develops the $T_W$ signal periodically for internal use, and also provides the $T_W$ signal to other functions, for example, phase click detector 220 and deviation detector 230. The $T_W$ period can be configured as, for example, 2 bit periods of an M-Bus preamble pattern. When enabled by the ENABLE signal, controller 240 responds to the values of the PJ and DEV signals over one or more programmable $T_W$ periods. Controller 240 is capable of counting multiple PJ signals during multiple $T_W$ periods, for example, 4 PJ signals during 4 consecutive Tw periods. Controller 240 is also capable of modifying the count based on, for example, the values of the PJ and the DEV signals, and the value of a particular count.

Controller 240 provides the VALUE signal to the set of comparators 250 to indicate it has detected a relatively small number of phase clicks on the PJ signal during one or more $T_W$ periods. The set of comparators 250 responds by providing the ARRIVAL SIGNAL to indicate it has detected a short preamble signal. Demodulator 260 forms the DEMODULATED SIGNAL based on the DIGITAL I, Q signals and uses the ARRIVAL SIGNAL, for example, to improve the performance of demodulator 260, AFC and AGC. In one embodiment, demodulator 260 initiates AFC on the preamble after receiving the ARRIVAL SIGNAL. Receiver 100 activates AFC after the set of comparators 250 asserts the ARRIVAL SIGNAL to prevent AFC frequency drift on input noise before detecting the preamble. Demodulator 260 is capable of measuring the frequency offset of the DIGITAL I, Q signals before the set of comparators 250 asserts the ARRIVAL SIGNAL. Demodulator 260 can compensate for frequency drift of the DIGITAL I, Q signals in "one shot" after the set of comparators 250 asserts the ARRIVAL SIGNAL. In the illustrated embodiment, demodulator 260 also exits a sleep mode in response to an activation of the ARRIVAL SIGNAL. In yet another embodiment, demodulator 260 initiates BCR on the preamble after receiving the ARRIVAL SIGNAL.

Combining the capability of phase click detector 220 and deviation detector 230 allows the set of comparators 250 to reliably assert the ARRIVAL SIGNAL after detecting a desired signal, such as a short preamble, while ignoring other signals that are not intended for processing by receiver 100. For example, the set of comparators 250 will not assert the ARRIVAL SIGNAL for signals such as an un-modulated tone, or a signal with a different deviation or data rate.

Thus signal arrival detector 200 provides an arrival signal based on a number of phase clicks being less than a threshold within a window, the receiver reliably detects short preambles in a relatively short time period, while reducing its power consumption.

Figure 3:
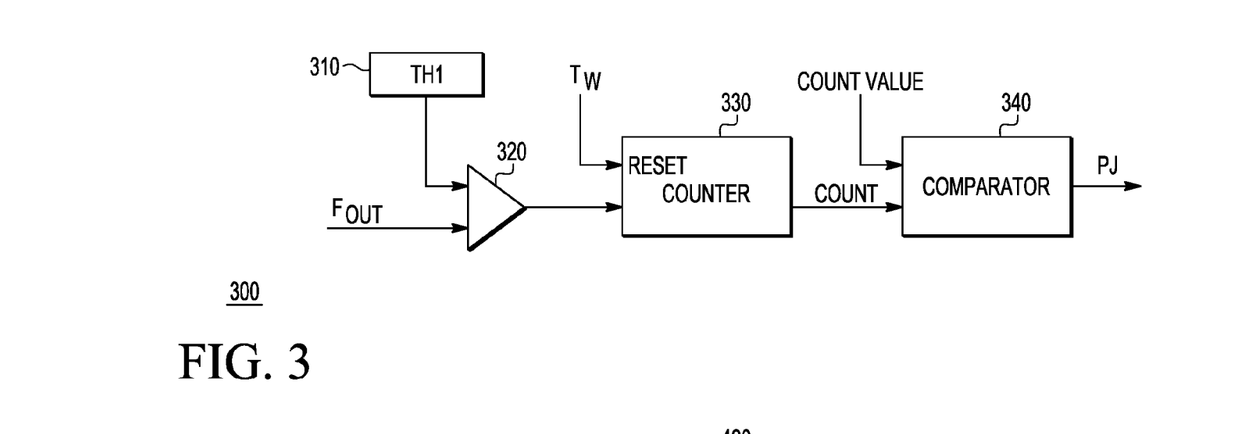
FIG. 3 illustrates in block diagram form a phase click detector that may be used as the phase click detector of FIG. 2.

FIG. 3 illustrates in block diagram form a phase click detector 300 that may be used as phase click detector 220 of FIG. 2. For the example shown in FIG. 3, phase click detector 300 includes a threshold circuit 310 labeled "TH1", a comparator 320, a phase click counter 330, and a comparator 340.

Threshold circuit 310 has an output for providing a phase change threshold value. Comparator 320 has a first input connected to the output of threshold circuit 310 for receiving the phase change threshold value, a second input for receiving the $F_{OUT}$ signal, and an output. Phase click counter 330 has a first input labeled "RESET" for receiving the $T_W$ signal, a second input connected to the output of comparator 320, and an output for providing a signal labeled "COUNT". Comparator 340 has a first input for receiving the COUNT VALUE signal, a second input connected to the output of phase click counter 330 for receiving the COUNT signal, and an output for providing the PJ signal.

In operation, comparator 320 receives the $F_{OUT}$ signal and compares phase changes of the $F_{OUT}$ signal to the phase change threshold provided by threshold circuit 310. Threshold circuit 310 could provide TH1 based on, for example, modulation parameters of receiver 100, and could provide TH1 based on the differentiation interval used by signal arrival detector 200. For the example shown in FIG. 3, comparator 320 provides phase clicks to phase click counter 330 based on a phase change of the AWGN, represented as:

$$A \text{ phase click} = \Theta_{n(i)} - \Theta_{n(i-1)} > TH1; \qquad [3]$$

Phase click counter 330 provides the COUNT signal corresponding to the number of counted phase clicks during a $T_W$ period to comparator 340. When the number of counted phase clicks is low, for example, zero or one phase clicks, comparator 340 asserts the PJ signal. When the $T_W$ period expires, the $T_W$ signal defines a next period and resets phase click counter 330.

In one embodiment, phase click detector 300 includes a moving average filter that averages the number of detected phase clicks over several $T_W$ periods. When the moving average drops below a certain threshold, signal arrival detector 200 determines the RF signal to noise ratio is strong enough to detect the received signal as a short preamble.

Figure 4:
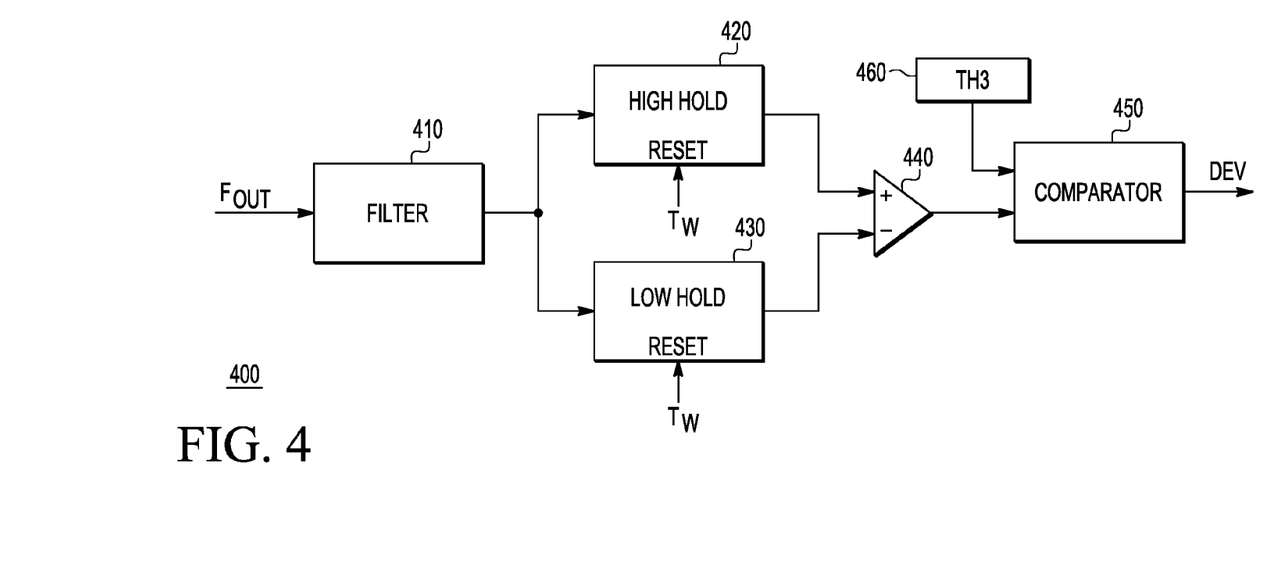
FIG. 4 illustrates in block diagram form a deviation detector that may be used as the deviation detector of FIG. 2.

FIG. 4 illustrates in block diagram form a deviation detector 400 that may be used as deviation detector 230 of FIG. 2. For the example shown in FIG. 4, deviation detector 400 includes a filter 410, a high hold register 420 labeled "HIGH HOLD", a low hold register 430 labeled "LOW HOLD", a subtractor 440, a window comparator 450, and a threshold circuit 460 labeled "TH3".

Filter 410 has an input for receiving the $F_{OUT}$ signal, and an output. High hold register 420 has a first input connected to the output of filter 410, a second input for receiving the $T_W$ signal, and an output. Low hold register 430 has a first input connected to the output of filter 410, a second input for receiving the $T_W$ signal, and an output. Subtractor 440 has a first input connected to the output of high hold register 420 labeled "+", a second input connected to the output of low hold register 430 labeled "−", and an output. Window comparator 450 has a first input connected to the output of threshold circuit 460 for receiving the peak to peak frequency threshold, a second input connected to the output of subtractor 440, and an output for providing the DEV signal.

In operation, filter 410 receives the $F_{OUT}$ signal and filters the $F_{OUT}$ signal so that high hold register 420 and low hold register 430 can properly update (by logic not shown in FIG. 4) the high and low values encountered during a timing window. Thus the logic increases or decreases the values in high hold register 420 and low hold register 430, respectively, if filter 410 provides a value that exceeds, or is less than, the previous values stored by high hold register 420 and low hold register 430, respectively, within a $T_W$ period. Like phase click counter 330, as each $T_W$ period expires, the $T_W$ signal defines a next period and resets high hold register 420 and low hold register 430. Subtractor 440 determines the difference between a measured low peak to peak frequency deviation and a measured high peak-to-peak deviation at the end of the $T_W$ period, before the $T_W$ signal resets high hold register 420 and low hold register 430. Threshold circuit 460 stores low and high threshold values for window comparator 450. If the difference between the high and low values, i.e. the peak-to-peak deviation or $F_{PP}$, is between the low and high threshold values, window comparator 450 activates the DEV signal to indicate a valid deviation that may be representative of a preamble pattern.

For the example shown in FIG. 4, window comparator 450 activates the DEV signal when:

$$F_{PP}\_MIN\_TH < F_{PP} < F_{PP}\_MAX\_TH; \quad [4]$$

in which threshold circuit 460 stores $F_{PP}$ _MIN_TH and $F_{PP}$ _MAX_TH.

In another embodiment, deviation detector 400 determines the absolute value of several deviation errors calculated during several $T_W$ periods, and deviation detector 400 combines and averages the deviation errors to improve the accuracy of the DEV signal. In yet another embodiment, demodulator 260 disables the AFC circuit while deviation detector 400 is processing the $F_{OUT}$ signal to improve the accuracy of the DEV signal.

Figure 5:
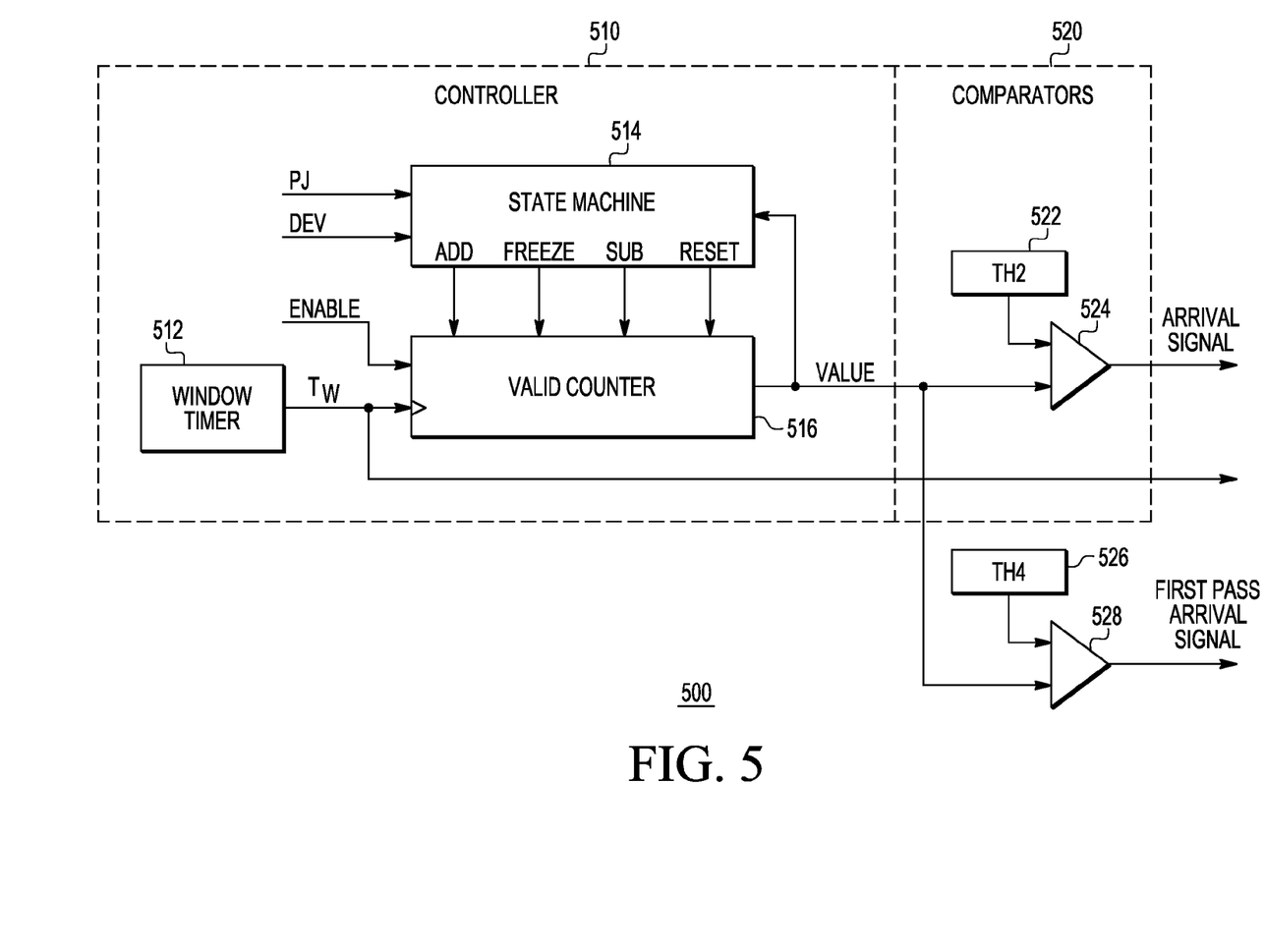
FIG. 5 illustrates in block diagram form a controller and a set of comparators that may be used as the controller and the set of comparators, respectively, of FIG. 2.

FIG. 5 illustrates in block diagram form a controller and a set of comparators 500 that may be used as controller 240 and the set of comparators 250, respectively, of FIG. 2. For the example shown in FIG. 5, controller and comparators 500 generally includes controller 510 and a set of comparators 520.

Controller 510 includes a window timer 512, a state machine 514, and a valid counter 516. Window timer 512 has an output for providing the $T_W$ signal. State machine 514 has a first input for receiving the PJ signal, a second input for receiving the DEV signal, a third input for receiving the VALUE signal, a first output labeled "ADD", a second output labeled "FREEZE", a third output labeled "SUB", and a fourth output labeled "RESET". Valid counter 516 has a first input for receiving the ENABLE signal, a second clock input connected to window timer 512 for receiving the $T_W$ signal, a third input connected to the ADD output of state machine 514, a fourth input connected to the FREEZE output of state machine 514, a fifth input connected to the SUB output of state machine 514, a sixth input connected to the RESET output of state machine 514, and an output connected to the input of state machine 514 for providing the VALUE signal.

The set of comparators 520 includes a threshold circuit 522 labeled "TH2", a comparator 524, a threshold circuit 526 labeled "TH4", and a comparator 528. Threshold circuit 522 has an output for providing a count threshold. Comparator 524 has a first input connected to the output of threshold circuit 522 for receiving the count threshold, a second input connected to the output of valid counter 516 for receiving the VALUE signal, and an output for providing the ARRIVAL SIGNAL. Threshold circuit 526 has an output for providing a count threshold. Comparator 528 has a first input connected to the output of threshold circuit 526 for receiving the count threshold, a second input connected to the output of valid counter 516 for receiving the VALUE signal, and an output for providing the FIRST PASS ARRIVAL SIGNAL.

In operation, window timer 512 provides the $T_W$ signal to valid counter 516, and as discussed above, also provides the $T_W$ signal to other functions of signal arrival detector 200. When enabled by the ENABLE signal, valid counter 516 provides the VALUE signal to the set of comparators 520. Valid counter 516 also provides the VALUE signal to state machine 514. State machine 514 responds by controlling the numerical value of the VALUE signal based on the PJ, DEV, and VALUE signals.

For the example shown in FIG. 5, state machine 514 controls the value of valid counter 516, based on the PJ signal to indicate a certain number of phase clicks during one or more $T_W$ periods. In controller 510, state machine 514 also controls the value of valid counter 516, based on the DEV signal to indicate the deviation of the phase of the $F_{OUT}$ signal compared to the phase change threshold during one or more $T_W$ periods. Responding to the state of the PJ and DEV signals, state machine 514 can transition to a finite number of states. For example, state machine 514 is capable of adding a certain number of counts to valid counter 516, subtracting a certain number of counts from valid counter 516, freezing the count of valid counter 516, or resetting the count of valid counter 516.

Comparator 524 compares the count represented by the VALUE signal to a certain count provided by threshold circuit 522. When the VALUE signal indicates for example, a relatively small number of phase clicks corresponding to the PJ signal during one or more $T_W$ periods, where the small number of counts are less than the value provided by threshold circuit 522, comparator 524 asserts the ARRIVAL SIGNAL to indicate the short preamble signal is strong enough for signal arrival detector 200 to detect.

Comparator 528 compares the count represented by the VALUE signal to a certain count provided by threshold circuit 526. When the VALUE signal indicates, for example, a relatively small number of phase clicks corresponding to the PJ signal during one or more $T_W$ periods, where the small number of counts are less than the value provided by threshold circuit 526, comparator 528 asserts the FIRST PASS ARRIVAL SIGNAL, and in response, receiver 100 generates an interrupt signal to the host MCU. If comparator 528 does not detect a first pass signal arrival, receiver 100 could scan a frequency for a next channel, or could transition to a low power state (sleep state) while continuing to monitor for the FIRST PASS ARRIVAL SIGNAL. Threshold circuit 526 provides a count (TH4) less than or equal to the count provided by threshold circuit 522 (TH2). Thus, comparator 528 generally asserts the FIRST PASS ARRIVAL SIGNAL in less Tw periods, than comparator 524 asserts the ARRIVAL SIGNAL.

Figure 6:
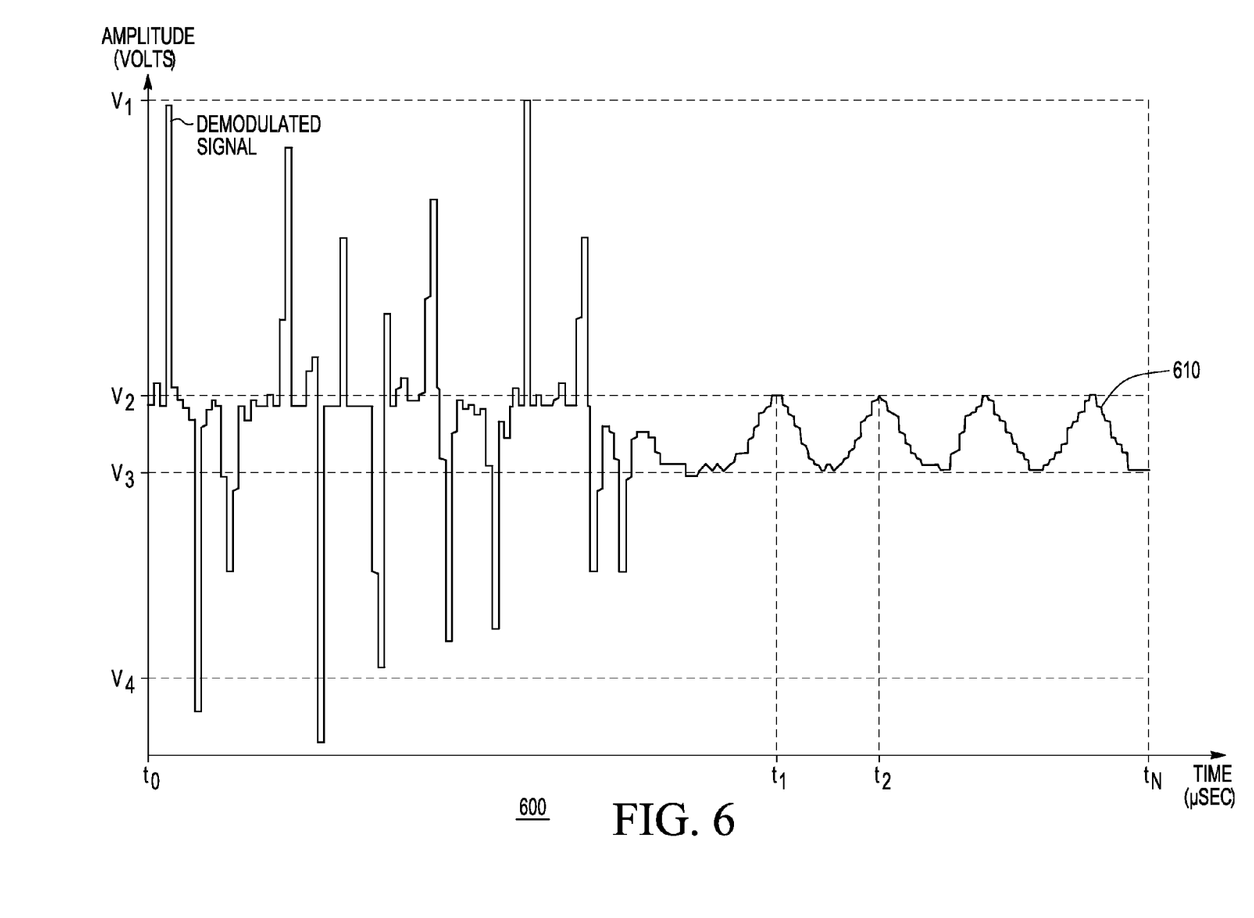
FIG. 6 illustrates a timing diagram of the operation of the receiver of FIG. 1.

FIG. 6 illustrates a timing diagram 600 of the operation of receiver 100 of FIG. 1. The horizontal axis represents time in microseconds, and the vertical axis represents the amplitude of various signals in volts. Timing diagram 600 illustrates a waveform 610, corresponding to the DEMODULATED SIGNAL. The horizontal axis illustrates four particular time points of interest labeled "$t_0$," "$t_1$," "$t_2$," and "$t_N$".

As shown in FIG. 6, during the time period from $t_0$ to $t_1$, waveform 610 represents the $\Theta_{IN}$ signal dominated by AWGN as defined by Equation[1]. Phase click detector 300 counts phase clicks of waveform 610 according to Equations [2] and [3] when the value of waveform 610 is greater than the threshold value provided by threshold circuit 310. Each phase click of waveform 610 is shown as a "spike" between points V1 and V2 on the vertical axis, where the value of the spike in v (t) is greater than the threshold value provided by threshold circuit 310.

During the time period from $t_1$ to $t_2$, and repeating through time point $t_N$, signal arrival detector 200 does not detect occurrences of phase clicks in waveform 610. During this period, waveform 610 is no longer dominated by AWGN. During the time period from $t_2$ to $t_N$, waveform 610 represents a filtered frequency modulated (FM) time varying signal. The filtered FM signal is defined by the equation:

$$S(t)=A_S \times (e^{-iwt+\Theta s(t)}); \qquad [5]$$

Where "$A_s$" is the amplitude of the filtered FM signal, and "$\Theta_s$" is the phase of the filtered FM signal.

Controller 240 responds to the low number of phase clicks (for example, zero phase clicks in FIG. 6) to provide the ARRIVAL signal to indicate the short preamble signal is strong enough for signal arrival detector 200 to detect.

Figure 7:
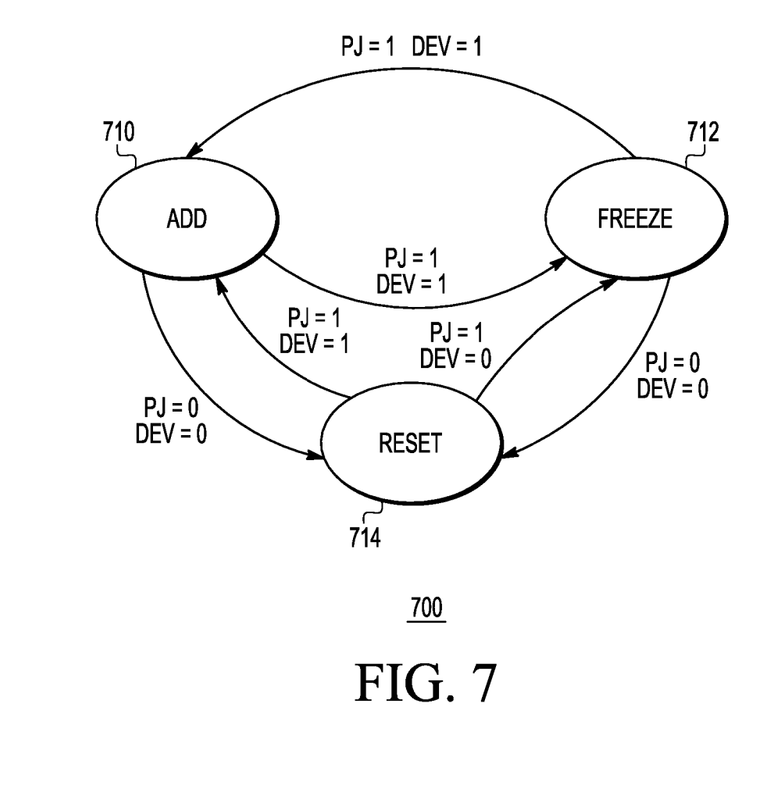
FIG. 7 illustrates a state diagram of the controller of FIG. 5.

FIG. 7 illustrates a state diagram 700 of controller 510 of FIG. 5. State diagram 700 illustrates three states of interest, including an add state 710, a freeze state 712, and a reset state 714.

Add state 710 has a first input transition upon a condition labeled "PJ=1 DEV=1", a second input transition upon a condition labeled "PJ=1 DEV=1", a first output transition upon a condition labeled "PJ=1 DEV=1", and a second output transition upon a condition labeled "PJ=0 DEV=0". Freeze state 712 has a first input transition from add state 710 upon the condition PJ=1 DEV=1, a second input transition upon the condition PJ=1 DEV=0, a first output transition to add state 710 upon the condition PJ=1 DEV=1, and a second output transition upon a condition labeled "PJ=0 DEV=0". Reset state 714 has a first input transition from add state 710 upon the condition PJ=0 DEV=0, a second input transition from freeze state 712 upon the condition PJ=0 DEV=0, a first output transition to add state 710 upon the condition PJ=1 DEV=1, and a second output transition to freeze state 712 upon the condition PJ=1 DEV=0.

TABLE 1 shows example state transitions of state machine 514 for various combinations of the PJ, DEV, and COUNT signals. When valid counter 516 has a low count value, for example, ≤2, state machine 514 could transition to reset state 714, to adjust for inaccuracies, false positives, misses, or failures, of the PJ and DEV signals. Also, when valid counter 516 has a higher count, for example, >2, state machine 514 could transition to a subtract state (not shown in state diagram 700), or to freeze state 712, to adjust for suspected inaccuracies or failures of the PJ and DEV signals. Note that state machine 514 is capable of adding or subtracting a value of 1, and can also add or subtract other values to or from valid counter 516. Also note that, in general, as shown in Table I, state machine 514 transitions to add state 710 when the PJ and DEV signals are both asserted, transitions to freeze state 712 when the PJ signal is asserted and the DEV signal is not asserted, and transitions to reset state 714, or the subtract state, when the PJ and DEV signals are both not asserted.

TABLE I

| PJ, DEV, and VALUE Signals Input Condition | State Machine 514 Output Transition |
|---|---|
| PJ = 0, DEV = 0 | Reset valid counter 516 (output transition to reset state 714) |
| PJ = 0, DEV = 0, VALUE > 2 | Subtract 1 from valid counter 516 (output transition to subtract state (not shown)) |
| PJ = 0, DEV = 0, VALUE ≤ 2 | Reset valid counter 516 (output transition to reset state 714) |
| PJ = 0, DEV = 1 | Subtract 1 from valid counter 516 (output transition to subtract state) |
| PJ = 0, DEV = 1 | Subtract a value from valid counter 516 (output transition to subtract state) |
| PJ = 1, DEV = 0 | Freeze the value of valid counter 516 (output transition to freeze state 712) |
| PJ = 1, DEV = 1 | Add 1 to valid counter 516 (output transition to add state 710) |
| PJ = 1, DEV = 1 | Add a value to valid counter 516 (output transition to add state 710) |

Figure 8:
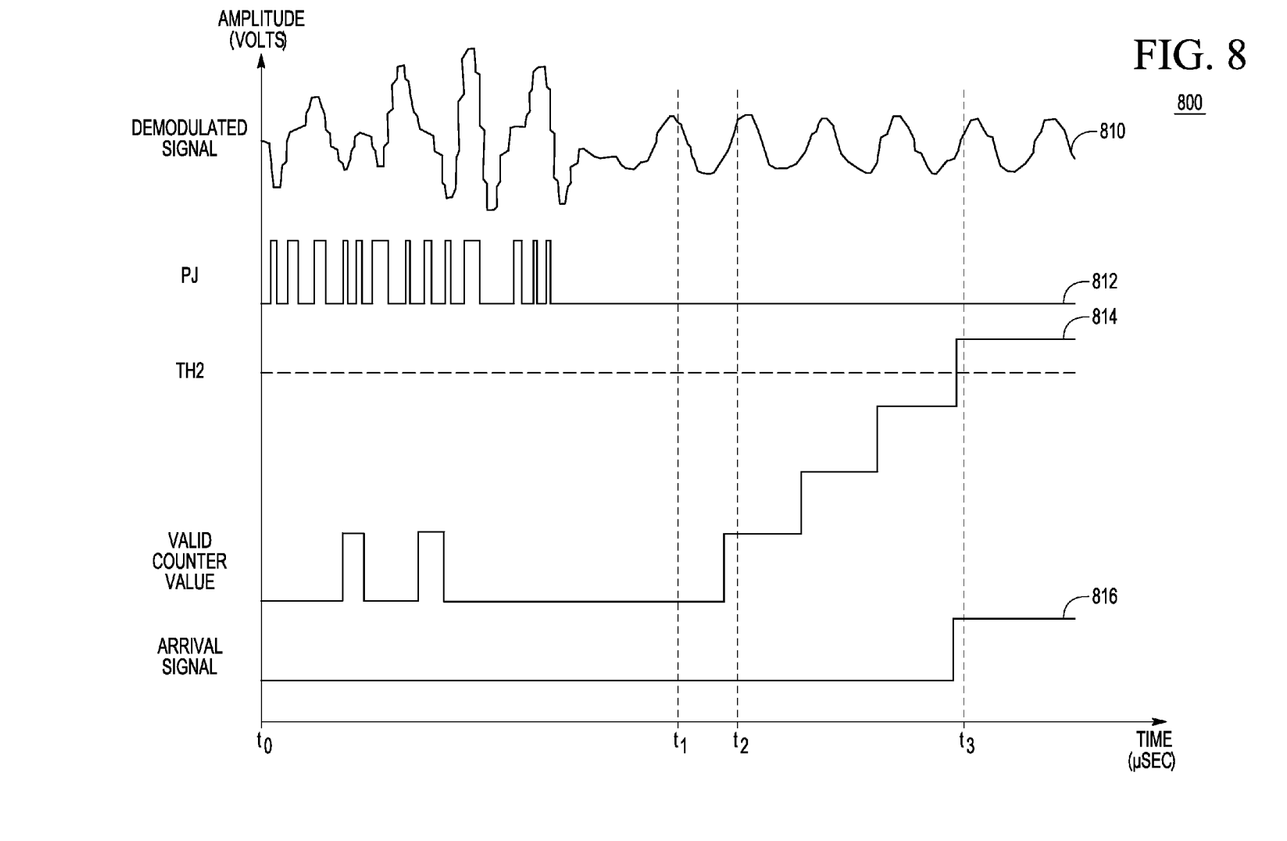
FIG. 8 illustrates a timing diagram of the operation of the signal arrival detector of FIG. 2.

FIG. 8 illustrates a timing diagram 800 of the operation of signal arrival detector 200 of FIG. 2. The horizontal axis represents time in microseconds, and the vertical axis represents the amplitude of various signals in volts. Timing diagram 800 illustrates four waveforms of interest, and the count threshold TH2 as a line of reference, including a waveform 810, corresponding to the DEMODULATED SIGNAL, a waveform 812, corresponding to the PJ signal, a waveform 814, corresponding to the VALUE signal labeled "VALID COUNTER VALUE", a waveform 816, corresponding to the ARRIVAL SIGNAL. The horizontal axis illustrates four particular time points of interest labeled "$t_0$", "$t_1$", "$t_2$", and "$t_3$".

As shown in FIG. 8, waveform 810 corresponds to waveform 610 of FIG. 6. During the time period from t0 to t1, waveform 812 has a relatively high number of phase clicks. During the time period from $t_1$ to $t_2$, and continuing through the time period from $t_2$ to $t_3$, waveform 812 does not include any phase clicks. For example, during each "step" in waveform 814, where each step has a width defined by the $T_W$ signal, valid counter 516 does not detect any phase clicks in waveform 812. At time period $t_3$, the set of comparators 250 asserts the ARRIVAL SIGNAL to indicate it has detected a desired signal, for example, a short preamble, corresponding to the detection of zero phase clicks in waveform 812.

Thus, A receiver, as described herein, achieves fast frequency convergence and conserves power, while reliably detecting short preambles, in a relatively short time period. The receiver signal arrival detector reacts well to frequency offset, so AFC can be postponed until after the arrival detector detects the preamble signal. Digital signal processor has a signal arrival detector that provides an arrival signal based on a number of phase clicks being less than a threshold within a window. In one embodiment, the signal arrival detector enhances the signal arrival detection by combining phase click detection with frequency deviation detection, where the deviation detector provides a deviation match signal based on a difference between a low detected deviation of a phase change signal and a high detected deviation of the phase change signal being less than a threshold. The signal arrival detector also includes a controller connected to the phase click detector to calculate a number of phase clicks within a time window, and a comparator to compare the number of phase clicks within the window, to provide an arrival signal if the number of phase clicks is less than a second threshold.

The above-disclosed subject matter is to be considered illustrative, and not restrictive, and the appended claims are intended to cover all such modifications, enhancements, and other embodiments that fall within the true scope of the claims. For example, illustrated in FIG. 5, controller and comparators 500 shows a hardware implementation of state machine 514. In other embodiments, state machine 514 could be implemented by a sequence of program steps, or any hardware function that is capable of holding in a current state in response to an event or a condition, and is also capable of transitioning to one of a finite number of other states when triggered by an event or a condition.

Note that the illustrated embodiments discuss a short preamble in an alternating . . . 1010 . . . pattern that is compatible with the M-Bus wireless communications standard. In other embodiments, signal arrival detector 200 could detect the arrival of another type of signal compatible with another communications protocol. For example, signal arrival detector 200 could detect a signal having a longer preamble length that is compatible with a legacy communications standard. Also, the circuits of receiver 100 could operate at different duty cycles while detecting the arrival of desired signals, to conserve power.

Note that in FIGS. 2 and 5, phase click detector 220 provides the PJ signal and deviation detector 230 provides the DEV signal to state machine 514. In other embodiments, signal arrival detector 200 could detect a desired signal using, for example, only the PJ output provided by phase click detector 220, and signal arrival detector 200 could be implemented without deviation detector 230.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver comprising:
   a circuit for representing an input signal as a sequence of complex numbers each having a respective amplitude and a respective phase;
   a phase click detector for detecting phase clicks in said input signal, wherein a phase click corresponds to a change in said phase of at least a first threshold from a first one of said complex numbers to a second one of said complex numbers;
   a controller coupled to the phase click detector for calculating a number of phase clicks within one or more time periods; and
   a comparator for comparing said number of phase clicks within said one or more time periods, and providing an arrival signal if said number of phase clicks is less than a second threshold.

2. The receiver of claim 1 wherein said comparator further provides a first pass arrival signal if said number of phase clicks is less than a third threshold, wherein said third threshold is less than said second threshold.

3. The receiver of claim 1 wherein said phase click detector comprises a phase click counter for counting said phase clicks in said input signal within said time period.

4. The receiver of claim 1, wherein said controller comprises:
   a window timer having an output for providing a window time signal periodically; and
   a valid counter having an increment input, a clock input for receiving said window time signal, and an output for providing a value equal to said number of phase clicks within said one or more time periods.

5. The receiver of claim 1, further comprising:
   a deviation detector for providing a deviation match signal in response to a difference between a low detected deviation of a phase change signal and a high detected deviation of said phase change signal being in a predetermined time period,
   wherein said controller is further responsive to said deviation match signal for calculating said number of phase clicks within said one or more time periods.

6. The receiver of claim 4, wherein said controller further comprises:
   a state machine, coupled to said phase click detector, for controlling said value of said valid counter in response to said number of phase clicks within said one or more time periods.

7. The receiver of claim 4, wherein said controller further comprises:
   a state machine, coupled to said phase click detector, for controlling said value of said valid counter in response to said number of phase clicks within said one or more time periods, and said value of said valid counter.

8. The receiver of claim 4, wherein said controller further comprises:
   a state machine, coupled to said phase click detector, for subtracting a number from said value of said valid counter in response to said number of phase clicks within said one or more time periods, and said value of said valid counter being greater than a predetermined number.

9. The receiver of claim 4, wherein said controller further comprises:
   a state machine, coupled to said phase click detector, for resetting said valid counter in response to said number of phase clicks within said one or more time periods, and said value of said valid counter being less than a predetermined number.

10. A receiver comprising:
    an analog receiver having an input for receiving a radio frequency (RF) signal, and an output for providing a digital intermediate frequency signal as a sequence of complex numbers each having a respective amplitude and a respective phase; and
    a digital processor having an input for receiving said digital intermediate frequency signal, and an output for providing a demodulated signal, comprising:
       a signal arrival detector having an output for providing at least one of an arrival signal and a first pass arrival signal, wherein said signal arrival detector provides said arrival signal in response to a number of phase clicks being less than a first threshold within one or more time periods, and wherein said signal arrival detector provides said first pass arrival signal in response to said number of phase clicks being less than a second threshold within one or more time periods, wherein a phase click corresponds to a change in said phase of at least a third threshold from a first one of said complex numbers to a second one of said complex numbers; and
       a demodulator responsive to said arrival signal, for demodulating said digital intermediate frequency signal.

11. The receiver of claim 10, wherein said demodulator initiates automatic frequency compensation (AFC) on a preamble in response to said arrival signal.

12. The receiver of claim 10, wherein said receiver enters a sleep mode in response to said signal arrival detector not asserting at least one of said arrival signal and said first pass arrival signal within said one or more time periods.

13. The receiver of claim 10, wherein said demodulator initiates bit clock recovery (BCR) on a preamble in response to said arrival signal.

14. The receiver of claim 10, wherein said receiver modifies a receive frequency in response to at least one of said arrival signal and said first pass arrival signal.

15. The receiver of claim 10, wherein said RF signal comprises a Meter-Bus (M-Bus) compatible short preamble.

16. The receiver of claim 10, wherein said signal arrival detector comprises:
    a window timer having an output for providing a window time signal periodically in response to a number of bit times of a preamble.

17. A method comprising:
    receiving an input signal;
    converting said input signal to an intermediate frequency signal comprising a sequence of complex numbers each having a respective amplitude and a respective phase;
    determining a number of phase clicks in said intermediate frequency signal in one or more time periods, wherein a phase click corresponds to a change in said phase of at least a first threshold from a first one of said complex numbers to a second one of said complex numbers; and
    comparing said number of phase clicks within said one or more time periods to a second threshold, and providing at least one of an arrival signal if said number of phase clicks is less than said second threshold, and a first pass arrival signal if said number of phase clicks is less than a third threshold.

18. The method of claim 17 wherein said determining said number of phase clicks further comprises:
    controlling a value of said number of phase clicks within said one or more time periods in response to said number of phase clicks in said intermediate frequency signal in said one or more time periods.

19. The method of claim 18 wherein said determining said number of phase clicks further comprises:
    freezing said value of said number of phase clicks within said one or more time periods in response to a deviation match signal.

\* \* \* \* \*